(12) United States Patent
Kong

(10) Patent No.: US 12,182,799 B2
(45) Date of Patent: Dec. 31, 2024

(54) PAYMENT PROCESSING SYSTEM AND METHOD

(71) Applicant: NETSUNION CLEARING CORPORATION, Beijing (CN)

(72) Inventor: Lingbin Kong, Beijing (CN)

(73) Assignee: NETSUNION CLEARING CORPORATION, Beijijng (CN)

( * ) Notice: Subject to any disclaimer, the term of this patent is extended or adjusted under 35 U.S.C. 154(b) by 144 days.

(21) Appl. No.: 17/771,494

(22) PCT Filed: Oct. 23, 2020

(86) PCT No.: PCT/CN2020/123160
§ 371 (c)(1),
(2) Date: Apr. 25, 2022

(87) PCT Pub. No.: WO2021/078245
PCT Pub. Date: Apr. 29, 2021

(65) Prior Publication Data
US 2022/0405736 A1    Dec. 22, 2022

(30) Foreign Application Priority Data

Oct. 25, 2019 (CN) .......................... 201911023701.6

(51) Int. Cl.
*G06Q 20/36* (2012.01)
*G06Q 20/02* (2012.01)

(52) U.S. Cl.
CPC ........... *G06Q 20/36* (2013.01); *G06Q 20/023* (2013.01)

(58) Field of Classification Search
CPC ...... G06Q 20/36; G06Q 20/023; G06Q 20/20; G06Q 20/385; G06Q 20/3274; G06Q 20/367; G06Q 20/02; G06Q 20/4014
See application file for complete search history.

(56) References Cited

U.S. PATENT DOCUMENTS 10,134,030 B2 * 11/2018 Bondesen .......... G06Q 20/0855
10,210,507 B2    2/2019 Li et al.
(Continued)

FOREIGN PATENT DOCUMENTS

CN    102696047 A  *  9/2012  ............. G06Q 20/20
CN    103679443 A     3/2014
(Continued)

OTHER PUBLICATIONS

"Future of Indentity and Access Management: The OpenID Connect Protocol", Omer Ofleh, University of Houston, Aug. 2018 (Year: 2018).*

(Continued)

*Primary Examiner* — Duan Zhang
(74) *Attorney, Agent, or Firm* — NZ Carr Law Office

(57) ABSTRACT

The present application provides a payment processing system and method, wherein the system comprises: a merchant terminal reading a user code of a user terminal to generate a transaction order and sending the order to an acquirer; the acquirer generating a payment request according to the order, sending the request to the clearing institution, and the clearing institution forwarding the request to an account institution according to the user code; the account institution making user funds deduction according to the request and returning payment processing result notification information to the clearing institution, and the clearing institution forwarding the information to the acquirer and an e-wallet backend system at the same time; the e-wallet backend system sending the information to the user terminal and the user terminal displaying a payment result, and the acquirer receiving the information forwarded by the clearing institution and the merchant terminal displaying the payment result.

12 Claims, 4 Drawing Sheets

(56) References Cited

U.S. PATENT DOCUMENTS

| 11,295,308 B1* | 4/2022 | Fortney .............. G06Q 20/4012 |
| 2013/0262309 A1* | 10/2013 | Gadotti .............. G06Q 20/3274 |
| | | 705/44 |
| 2015/0088674 A1 | 3/2015 | Flurscheim et al. |
| 2018/0204195 A1* | 7/2018 | Kang .................... G06Q 20/36 |

FOREIGN PATENT DOCUMENTS

| CN | 104217322 A | 12/2014 |
| CN | 107038560 A | 8/2017 |
| CN | 107609856 A | 1/2018 |
| KR | 101870130 B1 * | 6/2018 |

OTHER PUBLICATIONS

Office Action of the corresponding CN Patent Application No. 201911023701.6 issued on Mar. 26, 2021.
ISA/237) Written Opinion of the International Searching Authority dated Jan. 29, 2021.
International search report of the corresponding PCT Application No. PCT/CN2020/123160 mailed on Jan. 29, 2021 along with English translation thereof.
A copy of the international search report of the corresponding PCT Application No. PCT/CN2020/123160 mailed on Jan. 29, 2021 along with English translation thereof.

* cited by examiner

PAYMENT PROCESSING SYSTEM AND METHOD

CROSS-REFERENCES TO RELATED APPLICATIONS

This application claims the priority of Chinese Patent Application No. 201911023701.6 filed on Oct. 25, 2019 by NETSUNION CLEARING CORPORATION, and entitled "Payment Processing System and Method".

TECHNICAL FIELD

This application relates to the field of Internet technology, and in particular to a payment processing system and method.

BACKGROUND

Typically, an e-wallet refers to binding account information, such as a bank account opened by the user at an account institution, to an electronic wallet application of the user terminal, and generating account token information instead of a physical account through payment tokenization technology.

In the related art, a user code displayed by the e-wallet is used for a barcode payment when the e-wallet is ready for receipt via scanning. The uniqueness and mutual exclusivity of the user code between different account institutions cannot be guaranteed, resulting in the acquirer being unable to determine the account institution to which the user code belongs and unable to initiate payment requests to the account institution via the clearing institution, and the payment processing efficiency is relatively low.

SUMMARY

The present application is intended to solve, at least to some extent, one of the technical problems in the related technology.

The present application provides a payment processing system and method for solving the technical problem in the prior art that the acquirer cannot determine the account institution to which the user code belongs and the payment processing efficiency is relatively low, which can realize the interconnection of the electronic wallet and the account institution through the clearing institution and improve the payment processing efficiency.

An embodiment of the first aspect of the present application provides a payment processing system, comprising: a user terminal, a merchant terminal, an e-wallet backend system, a clearing institution, an acquirer and an account institution;
  the merchant terminal reading a user code of the user terminal to generate a order and sending the order to the acquirer;
  the acquirer generating a payment request according to the order and sending the payment request to the clearing institution; the clearing institution forwarding the payment request to the account institution according to the user code;
  the account institution making user funds deduction according to the payment request and returning payment processing result notification information to the clearing institution, and the clearing institution forwarding the payment result notification information to the acquirer and an e-wallet backend system at the same time;
  the e-wallet backend system sending the payment result notification information to the user terminal and the user terminal displaying the payment result; the acquirer receiving the payment result notification information forwarded by the clearing institution and the merchant terminal displaying the payment result.

As a first possible way of implementation of embodiments of the present application, before the merchant terminal reading a user code of the user terminal to generate a order, it further comprises:
  the user terminal sending a user code application request to the e-wallet backend system, the e-wallet backend system sending the user code application request to the clearing institution;
  the clearing institution generating a user code according to the user code application request and sending it to the e-wallet backend system, the e-wallet backend system returning the user code to the user terminal and displaying the user code at the user terminal.

As a second possible way of implementation of embodiments of the present application, before the user terminal sending a user code application request to the e-wallet backend system, it further comprises:
  the user terminal acquiring account information to be bound and sending it to the e-wallet backend system;
  the e-wallet backend system sending a business opening application request to the clearing institution according to the account information to be bound;
  the clearing institution acquiring the account information to be bound according to the business opening application request, recording account information the account information to be bound, and forwarding the account information to be bound to the account institution;
  the account institution verifying the account information to be bound and returning business opening result to the clearing institution;
  the clearing institution recording the business opening result and forwarding the business opening result to the e-wallet backend system, and the e-wallet backend system returning the business opening result to the user terminal.

As a third possible way of implementation of embodiments of the present application, before forwarding the account information to be bound to the account institution, it further comprises:
  the clearing institution determining whether the account information to be bound is bound account information according to the recorded information;
  returning the business opening result directly to the e-wallet backend system, if the account information to be bound is a bound account information.

As a fourth possible way of implementation of embodiments of the present application, before the merchant terminal reading a user code of the user terminal to generate a order, it further comprises:
  the user terminal generating the user code by means of a predetermined fixed algorithm.

As a fifth possible way of implementation of embodiments of the present application, the clearing institution forwarding the payment request to the account institution comprises:
  the clearing institution verifying the user code by means of the predetermined fixed algorithm;

selecting the account institution to which the account belongs according to the user code and forwarding the payment request to the account institution.

As a sixth possible way of implementation of embodiments of the present application, the account information to be bound comprises:

one or more of an account name, an account number, a user identification information and a contact information reserved by a user when opening an account with the account institution.

In the embodiments of the payment processing system of the present application, generating a order through reading a user code of a user terminal with a merchant terminal, and sending the order to an acquirer; the acquirer generating a payment request according to the order, sending the payment request to the clearing institution, and the clearing institution forwarding the payment request to an account institution according to the user code; the account institution making user funds deduction according to the payment request and returning payment processing result notification information to the clearing institution, and the clearing institution forwarding the payment result notification information to the acquirer and an e-wallet backend system at the same time; the e-wallet backend system sending the payment result notification information to the user terminal and the user terminal displaying a payment result, and the acquirer receiving the payment result notification information forwarded by the clearing institution and the merchant terminal displaying the payment result. Thus, it solves the technical problem in the prior art that the acquirer cannot determine the account institution to which the user code belongs and the payment processing efficiency is relatively low, can realize the interconnection of the electronic wallet and the account institution through the clearing institution and improve the payment processing efficiency.

An embodiment of the second aspect of the present application provides a payment processing method, comprising:

a merchant terminal reading a user code of a user terminal to generate a order and sending the order to an acquirer;

the acquirer generating a payment request according to the order, sending the payment request to the clearing institution; the clearing institution forwarding the payment request to an account institution according to the user code;

the account institution making user funds deduction according to the payment request and returning payment processing result notification information to the clearing institution; the clearing institution forwarding the payment result notification information to the acquirer and an e-wallet backend system at the same time;

the e-wallet backend system sending the payment result notification information to the user terminal and the user terminal displaying a payment result; and the acquirer receiving the payment result notification information forwarded by the clearing institution and the merchant terminal displaying the payment result.

In the embodiments of the payment processing method of the present application, a merchant terminal reading a user code of a user terminal to generate a order and sending the order to an acquirer; the acquirer generating a payment request according to the order, sending the payment request to the clearing institution; the clearing institution forwarding the payment request to an account institution according to the user code; the account institution making user funds deduction according to the payment request and returning payment processing result notification information to the clearing institution; the clearing institution forwarding the payment result notification information to the acquirer and an e-wallet backend system at the same time; the e-wallet backend system sending the payment result notification information to the user terminal and the user terminal displaying a payment result; and the acquirer receiving the payment result notification information forwarded by the clearing institution and the merchant terminal displaying the payment result. Thus, it solves the technical problem in the prior art that the uniqueness and mutual exclusivity of the user code between different account institutions cannot be guaranteed, resulting in the acquirer being unable to determine the account institution to which the user code belongs and unable to initiate payment requests to the account institution via the clearing institution, and the payment processing efficiency is relatively low, and can realize the interconnection between the e-wallet and the account institution via the clearing institution and improve the payment processing efficiency.

An embodiment of the third aspect of the present application provides another payment processing method, applied to a clearing institution, comprising:

receiving a payment request from an acquirer; wherein the payment request is generated by the acquirer according to a order, the order being generated by a merchant terminal after reading a user code of a user terminal;

forwarding the payment request to an account institution according to the user code such that the account institution makes user funds deduction according to the payment request and generates a payment processing result notification information;

receiving the payment processing result notification information returned by the account institution and forwarding the payment result notification information to the acquirer and an e-wallet backend system such that the e-wallet backend system sends the payment result notification information to the user terminal and the payment result is displayed at the user terminal, and such that the acquirer sends the payment result notification information to the merchant terminal and the payment result is displayed at the merchant terminal.

As a first possible way of implementation of embodiments of the present application, before receiving a payment request from an acquirer, it further comprises:

receiving a user code application request from the e-wallet backend system, the user code application request being forwarded by the e-wallet backend system according to the user code application request from the user terminal;

generating a user code according to the user code application request and returning the user code to the e-wallet backend system, so that the e-wallet backend system returns the user code to the user terminal and the user code is displayed at the user terminal.

As a second possible way of implementation of embodiments of the present application, before receiving a user code application request from the e-wallet backend system, it further comprises:

receiving a business opening application request from the e-wallet backend system, the business opening application request being generated by the e-wallet backend system according to an account information to be bound acquired and sent by the user terminal;

acquiring the account information to be bound according to the business opening application request, recording the account information to be bound in an account information, and forwarding the account information to be bound to the account institution such that the account institution verifies the account information to be bound and generates a business opening result;

receiving the business opening result returned by the account institution and forwarding the business opening result to the e-wallet backend system, so that the e-wallet backend system returns the business opening result to the user terminal.

As a third possible way of implementation of embodiments of the present application, before forwarding the account information to be bound to the account institution, it further comprises:

determining whether the account information to be bound is a bound account information according to the recorded information;

returning the business opening result directly to the e-wallet backend system, if the account information to be bound is a bound account information.

As a fourth possible way of implementation of embodiments of the present application, the forwarding the payment request to the account institution according to the user code comprises:

verifying the user code by means of a predetermined fixed algorithm; wherein the user code is generated by the user terminal by means of the predetermined fixed algorithm;

selecting the account institution to which the account belongs according to the user code and forwarding the payment request to the account institution.

As a fourth possible way of implementation of embodiments of the present application, the account information to be bound comprises at least one of:

an account name;

an account number;

a user identification information;

a contact information reserved by a user when opening an account with the account institution.

The embodiments of the payment processing method of the present application, applied to a clearing institution, comprise: receiving a payment request generated by an acquirer according to a order; a merchant terminal reading a user code of a user terminal to generate a order; forwarding the payment request to an account institution according to the user code such that the account institution makes user funds deduction according to the payment request and generates a payment processing result notification information that returns to a clearing institution; forwarding the payment result notification information to the acquirer and an e-wallet backend system at the same time such that the e-wallet backend system sends the payment result notification information to the user terminal and the payment result is displayed at the user terminal, and such that the acquirer sends the payment result notification information to the merchant terminal and the payment result is displayed at the merchant terminal. Thus, it solves the technical problem in the prior art that the uniqueness and mutual exclusivity of the user code between different account institutions cannot be guaranteed, resulting in the acquirer being unable to determine the account institution to which the user code belongs and unable to initiate payment requests to the account institution by the clearing institution, and the payment processing efficiency is relatively low, and can realize the interconnection between the e-wallet and the account institution via the clearing institution and improve the payment processing efficiency.

An embodiment of the fourth aspect of the present application provides a payment processing device, applied to a clearing institution, comprising:

a first receiving module for receiving a payment request from an acquirer; wherein the payment request is generated by the acquirer according to a order, the order being generated by a merchant terminal after reading a user code of a user terminal;

a first forwarding module for forwarding the payment request to an account institution according to the user code such that the account institution makes user funds deduction according to the payment request and generates a payment processing result notification information;

a second forwarding module for receiving the payment processing result notification information returned by the account institution and forwarding the payment result notification information to the acquirer and an e-wallet backend system such that the e-wallet backend system sends the payment result notification information to the user terminal and the payment result is displayed at the user terminal, and such that the acquirer sends the payment result notification information to the merchant terminal and the payment result is displayed at the merchant terminal.

As a first possible way of implementation of embodiments of the present application, the payment processing device further comprises:

a second receiving module for receiving a user code application request from the e-wallet backend system, the user code application request being forwarded by the e-wallet backend system according to the user code application request from the user terminal;

a sending module for generating a user code according to the user code application request and returning the user code to the e-wallet backend system, so that the e-wallet backend system returns the user code to the user terminal and the user code is displayed at the user terminal.

As a second possible way of implementation of embodiments of the present application, the payment processing device further comprises:

a third receiving module for receiving a business opening application request from the e-wallet backend system, the business opening application request being generated by the e-wallet backend system according to an account information to be bound acquired and sent by the user terminal;

an acquisition-record module for acquiring the account information to be bound according to the business opening application request, recording the account information to be bound in an account information, and forwarding the account information to be bound to the account institution such that the account institution verifies the account information to be bound and generates a business opening result;

a receiving-forwarding module for receiving the business opening result returned by the account institution and forwarding the business opening result to the e-wallet backend system, so that the e-wallet backend system returns the business opening result to the user terminal.

As a third possible way of implementation of embodiments of the present application, the payment processing device further comprises:

a determination module for determining whether the account information to be bound is a bound account information according to the recorded information;

a return module for returning the business opening result directly to the e-wallet backend system, if the account information to be bound is a bound account information.

As a fourth possible way of implementation of embodiments of the present application, the second forwarding module is specifically configured for:

verifying the user code by means of a predetermined fixed algorithm; wherein the user code is generated by the user terminal by means of the predetermined fixed algorithm;

selecting the account institution to which the account belongs according to the user code and forwarding the payment request to the account institution.

As a fifth possible way of implementation of embodiments of the present application, the account information to be bound comprises at least one of:

an account name;
an account number;
a user identification information;
a contact information reserved by a user when opening an account with the account institution.

The embodiments of the payment processing device of the present application, applied to a clearing institution, comprise: receiving a payment request generated by an acquirer according to a order; a merchant terminal reading a user code of a user terminal to generate a order; forwarding the payment request to an account institution according to the user code such that the account institution makes user funds deduction according to the payment request and generates a payment processing result notification information that returns to a clearing institution; forwarding the payment result notification information to the acquirer and an e-wallet backend system at the same time such that the e-wallet backend system sends the payment result notification information to the user terminal and the payment result is displayed at the user terminal, and such that the acquirer sends the payment result notification information to the merchant terminal and the payment result is displayed at the merchant terminal. Thus, it solves the technical problem in the prior art that the uniqueness and mutual exclusivity of the user code between different account institutions cannot be guaranteed, resulting in the acquirer being unable to determine the account institution to which the user code belongs and unable to initiate payment requests to the account institution by the clearing institution, and the payment processing efficiency is relatively low, and can realize the interconnection between the e-wallet and the account institution via the clearing institution and improve the payment processing efficiency.

An embodiment of the fifth aspect of the present application provides a computer device comprising a memory, a processor and a computer program stored in the memory and executable by the processor, the payment processing method as described in the above embodiments being implemented when the processor executes the program.

An embodiment of the sixth aspect of the present application provides a non-transitory computer readable storage medium having a computer program stored thereon, the payment processing method as described in the above embodiments being implemented when the program is executed by the processor.

Additional aspects and advantages of the present application will be given in part in the following description, in part as will become apparent from the following description, or as will be learned through the practice of the present application.

DETAILED EMBODIMENTS

Figure 1:
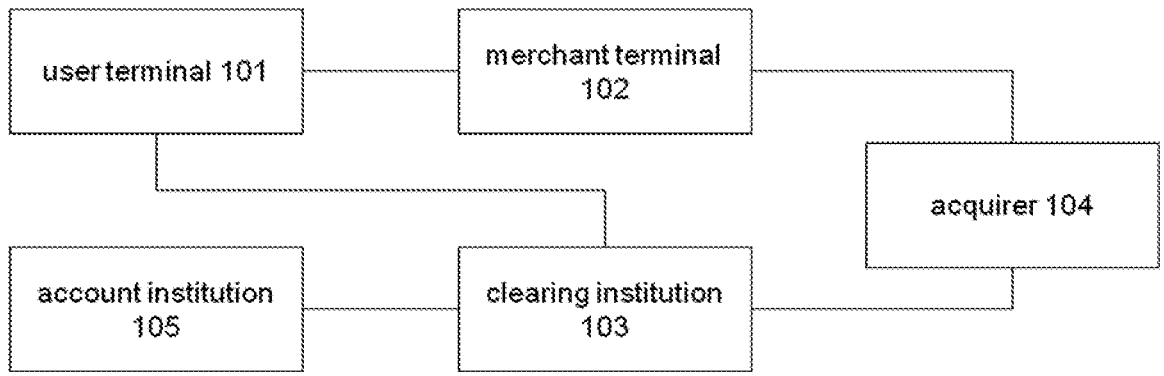
FIG. 1 is a schematic diagram of the structure of the payment processing system provided in an embodiment of the present application.

Embodiments of the present application are described in detail below, and examples of the embodiments are shown in the drawings, wherein the same or similar reference signs from beginning to end indicate the same or similar components or components having the same or similar functions. The embodiments described below by reference to the drawings are exemplary and are intended to be used to explain the present application and are not to be construed as limiting the present application.

The following describes the payment processing system and method provided according to embodiments of the present application with reference to the drawings.

FIG. 1 is a schematic diagram of the structure of the payment processing system provided in an embodiment of the present application.

As shown in FIG. 1, the payment processing system comprises: a user terminal 101, a merchant terminal 102, a clearing institution 103, an acquirer 104 and an account institution 105.

Wherein, the merchant terminal 102 reads a user code of the user terminal 101 to generate a order and sends the order to the acquirer 104.

The acquirer 104 generates a payment request according to the order and send the payment request to the clearing institution 103, and the clearing institution 103 forwards the payment request to the account institution 105 according to the user code.

The account institution 105 makes user funds deduction according to the payment request and returns payment processing result notification information to the clearing institution 103, and the clearing institution 103 forwards the payment result notification information to the acquirer 104 and an e-wallet backend system at the same time.

The e-wallet backend system send the payment result notification information to the user terminal 101 and the user terminal 101 displays the payment result. The acquirer 104 receives the payment result notification information forwarded by the clearing institution 103 and the merchant terminal 102 displays the payment result.

It should be noted that the e-wallet backend system is located on the user terminal 101 side and is capable of responding to individual messages of an electronic application in the user terminal 101.

Specifically, in the e-wallet barcode payment, the participants comprise the user terminal 101 (i.e. payer), the merchant terminal 102 (i.e. payee), the acquirer 104, the account institution 105, and the clearing institution 103. It is understood that the user opens an account with the account institution 105, a physical account is bound with the e-wallet application of the user terminal 101, and a user barcode is shown in the barcode payment process. The merchant terminal 102 uses a barcode acquiring service provided by the acquirer 104 and accepts the payment of products by the user through various barcodes to complete transactions. The acquirer 104 is responsible for signing the merchant into the network and daily management, providing and maintaining the barcode acceptance terminal and merchant code plate etc., receiving and processing the barcode payment instructions forwarded by the clearing institution 103, and handling the settlement of merchant acquiring funds. The account institution 105 is responsible for opening user accounts and providing account services, receiving and processing the barcode payment instructions forwarded by the clearing institution 103, and handling user funds settlement. The clearing institution 103 is responsible for receiving and processing the barcode payment instructions and clearing transaction funds, and plays the role of transaction intermediary transfer and funds clearing in the barcode payment business.

Figure 2:
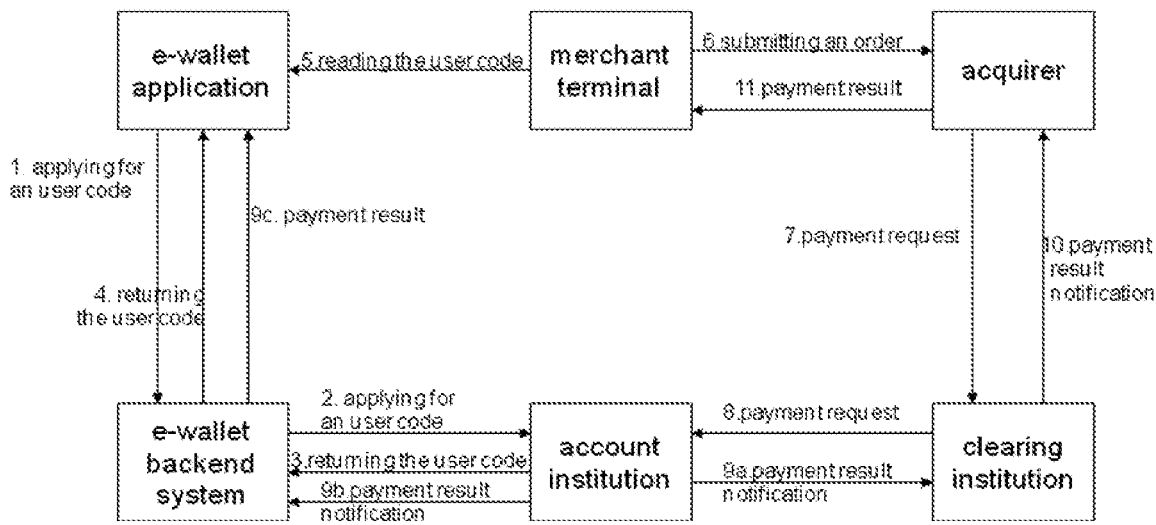
FIG. 2 is an example diagram of the payment processing system provided in an embodiment of the present application.

Specifically, in the barcode payment, a payment behavior where the user code is displayed in the e-wallet application of the user terminal 101 and the merchant terminal 102 reads the user code (i.e., the merchant sweeps the user code) to make payment, is usually called "code scanning for receiving payment", as shown in FIG. 2. Among them, the user code is used to uniquely identify the user's identity and payment mode, information about the user's account opened at the account institution is associated using the payment tokenization technology, and the user code is generated dynamically for one-time use and is updated regularly.

Specifically, the user selects a payment mode in the e-wallet application (user terminal 101) of the mobile terminal, and a user code application request is sent to the e-wallet backend system. The e-wallet backend system sends the user code application request to the account institution 105 specified by the user, and the account institution 105 generates a user code and returns the user code to the e-wallet backend system. The e-wallet backend system returns the user code to the e-wallet application and the e-wallet application displays the user code. The merchant terminal 102 reads the user code through the barcode acceptance terminal, and submits an order to the acquirer 104. The acquirer 104 calls a barcode payment interface and submits the payment request to the clearing institution 103. The clearing institution 103 receives the payment request and forwards the payment request to the account institution 105. The account institution 105 receives the payment request forwarded by the clearing institution 103, completes user funds deduction, and returns the payment processing result to the clearing institution 103. Meanwhile, the account institution 105 notifies the payment result to the e-wallet backend system, and then the e-wallet backend system notifies the e-wallet application to display the payment result to the user. The clearing institution 103 receives the payment result notification and forwards it to the acquirer 104. The acquirer 104 receives the payment result notification forwarded by the clearing institution 103 and sends a barcode payment result to the merchant terminal 102 for display.

The e-wallet barcode payment further comprises a business opening process before barcode payment. The business opening refers to the activity of binding a physical account in the e-wallet application of the user terminal 101.

Figure 3:
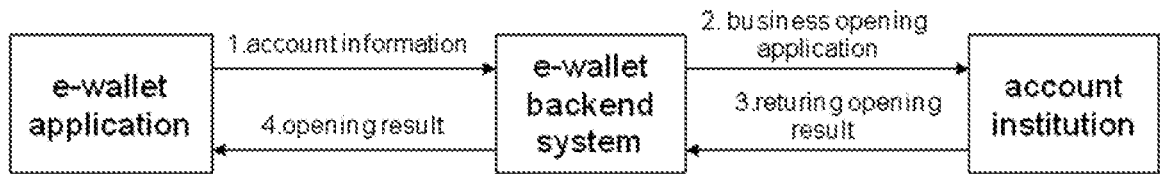
FIG. 3 is an example diagram of the payment processing system provided in another embodiment of the present application.

For example, as shown in FIG. 3, the e-wallet application of the user terminal 101 fills in the account information to be bound, which usually includes an account name, an account number, a user identity information, the contact information reserved by the user when opening the account with the account institution, etc. The e-wallet application sends the account information to the e-wallet backend system. The e-wallet backend system, according to the users account information, submits a business opening application to the account institution 105 to which the user's account belongs. The account institution 105 verifies the user's identity, account information, etc. and returns the business opening result to the e-wallet backend system. The e-wallet backend system completes the binding of the user's account and returns the business opening result to the e-wallet application.

Therefore, it can be seen that the coding rules of the user code are not uniform and lack of integrated management, the uniqueness and mutual exclusivity of the user code between different account institutions cannot be guaranteed, resulting in the acquirer being unable to determine the account institution to which the user code belongs and unable to initiate payment requests to the account institution via the clearing institution. Further, as respective two of e-wallets and account institutions are interconnected, interface standards are non-unique, which leads to high costs for development and maintenance caused by docking.

Figure 4:
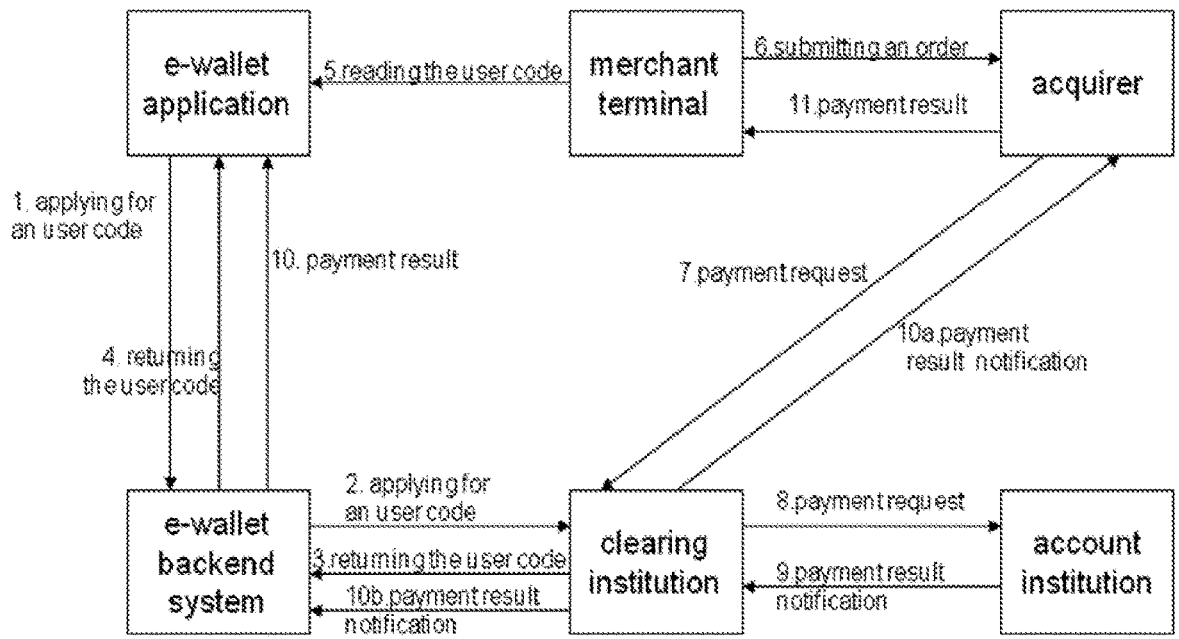
FIG. 4 is an example diagram of the payment processing system provided in yet another embodiment of the present application.

Regarding this problem, the payment processing method of the present application is shown in FIG. 4, the user selects a payment mode in the e-wallet application (user terminal 101) of the mobile terminal, and a user code application request is sent to the e-wallet backend system. The e-wallet backend system sends the user code application request to the clearing institution 103, and the clearing institution 103 generates a user code and returns it to the e-wallet backend system. The e-wallet backend system returns the user code to the e-wallet application and the e-wallet application displays the user code. The merchant terminal 102 reads the user code through the barcode acceptance terminal, and the merchant terminal 102 submits the order to the acquirer 104. The acquirer 104 calls a barcode payment interface and submits the payment request to the clearing institution 103. The clearing institution 103 receives the payment request, selects the account institution 105 to which the account belongs according to the user code and forwards the payment request to the account institution 105. The account institution 105 receives the payment request forwarded by the clearing institution 103, completes user funds deduction, and returns the payment processing result to the clearing institution 103. The clearing institution 103 receives the payment result notification and forwards it to the acquirer 104. Meanwhile, the clearing institution 103 notifies the payment result to the e-wallet backend system, and then the e-wallet backend system notifies the e-wallet application to display the payment result to the user. The acquirer 104 receives the payment result notification forwarded by the clearing institution 103 and displays the barcode payment result to the merchant.

Figure 5:
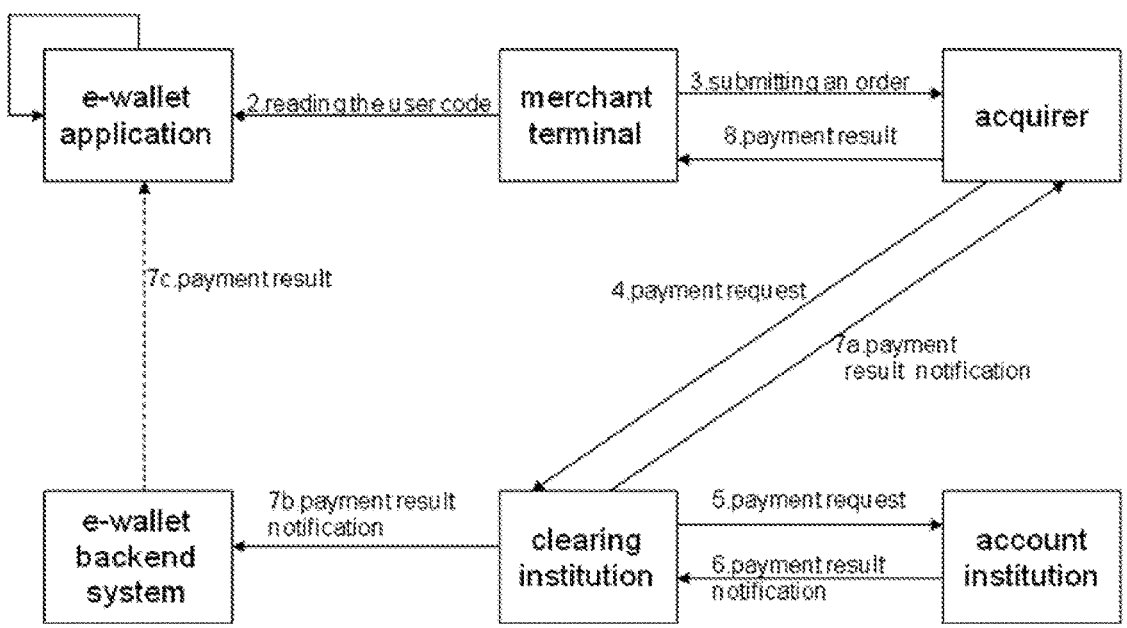
FIG. 5 is an example diagram of e-wallet business opening provided in an embodiment of the present application.

Based on the above description, the present application can also support a scenario of code scanning for receiving payment of an offline e-wallet barcode payment, where the e-wallet application and the clearing institution 103 use the same fixed algorithm, and dynamically generate a user code according to business opening result. The fixed algorithm keeps the user code for one-time use and regular updates, including but not limited to one-time password algorithms based on time and counts, etc., as shown in FIG. 5.

The e-wallet application of the user terminal 101 selects a payment mode and the e-wallet application generates a user code using a fixed algorithm. The merchant terminal 102 reads the user code through the barcode acceptance terminal, and submits the order to the acquirer 104. The acquirer 104 calls a barcode payment interface and submits the payment request to the clearing institution 103. The clearing institution 103 receives the payment request, verifies the user code using the fixed algorithm, selects the account institution 105 to which the account belongs according to the user code and forwards the payment request to the account institution 105. The account institution 105 receives the payment request forwarded by the clearing institution 103, completes user funds deduction, and returns the payment processing result to the clearing institution 103. The clearing institution 103 receives the payment result notification and forwards it to the acquirer 104. Meanwhile, the clearing institution 103 notifies the payment result to the e-wallet backend system, and then the e-wallet backend system can try to notify the e-wallet application to display the payment result to the user. The acquirer 104 receives the payment result notification forwarded by the clearing institution 103 and displays the barcode payment result to the merchant terminal 102.

Figure 6:
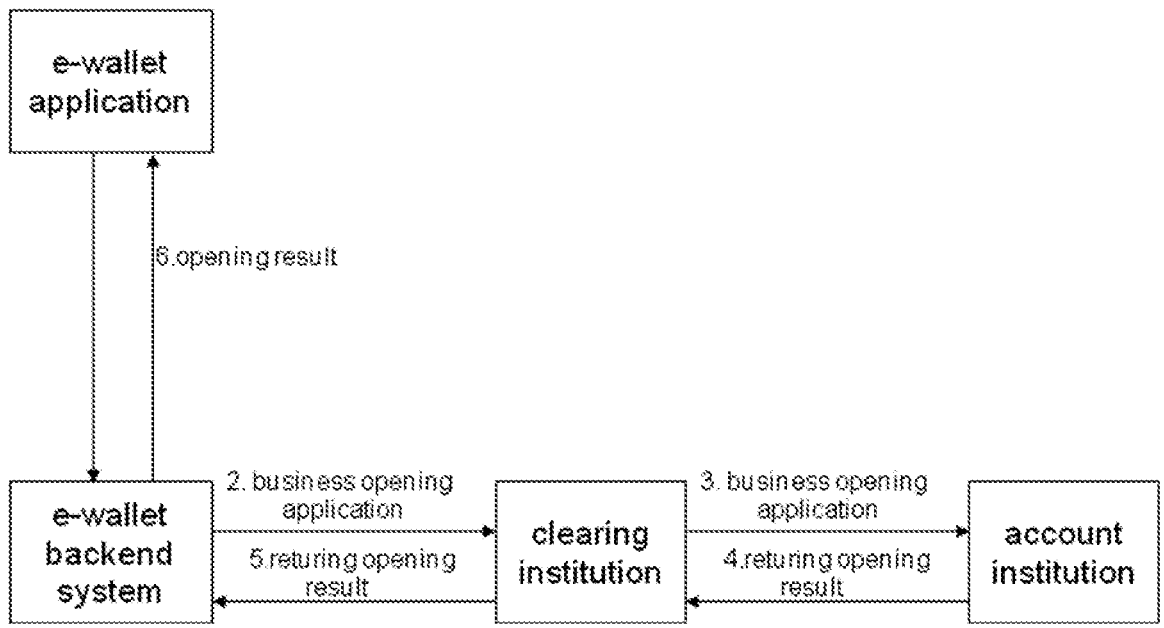
FIG. 6 is an example diagram of e-wallet business opening provided in another embodiment of the present application.

In the present application, the business opening of e-wallet barcode payment may be carried out in the way shown in FIG. 6, the interconnection of e-wallet and account institution may be conducted through clearing institution, and the ability of one-point access to functions and service interoperability of e-wallet and account institution may be realized by means of unified interface standard and unified coding specification.

Specifically, as shown in FIG. 6, the e-wallet application of the user terminal 101 fills in the account information to be bound, and sends the account information to be bound to the e-wallet backend system. The e-wallet backend system submits a business opening application request to the clearing institution 103. The clearing institution 103 receives the business opening application request, records the account information, and forwards it to the account institution 105. The account institution 105 verifies the user identity, the account information, etc. and returns business opening result to clearing institution 103. Then the clearing institution 103 records the business opening result and forwards it to the e-wallet backend system. The e-wallet backend system completes user account binding and returns the business opening result to the e-wallet application.

It should be noted that the present application may also provide support when multiple e-wallets are bound to the same user's physical account. The clearing institution 103 may determine whether the account has been bound, and return the business opening result directly to the e-wallet backend system for a bound account information, to further improve the payment processing efficiency.

In the embodiments of the payment processing system of the present application, a merchant terminal reading a user code of a user terminal to generate a order and sending the order to an acquirer; the acquirer generating a payment request according to the order, and send the payment request to a clearing institution, and the clearing institution forwarding the payment request to an account institution according to the user code; the account institution making user funds deduction according to the payment request and returning payment processing result notification information to the clearing institution, and the clearing institution forwarding the payment result notification information to the acquirer and an e-wallet backend system at the same time; the e-wallet backend system sending the payment result notification information to the user terminal and the user terminal displaying the payment result, and the acquirer receiving the payment result notification information forwarded by the clearing institution and the merchant terminal displaying the payment result. The unified coding rules of user code by the clearing institution can ensure the uniqueness and mutual exclusivity of the user code, so that the account institution to which the user code belongs can be determined, and the e-wallet and the account institution use the unified interface standard to access the clearing institution, reducing costs for the development, operation and maintenance, as well as supporting the code scanning for receiving payment in a weak network environment or offline, which does not affect the e-wallet barcode payment transactions due to the quality of the user network and improves the payment processing efficiency.

In order to realize the above embodiments, the present application also provides a payment processing method.

Figure 7:
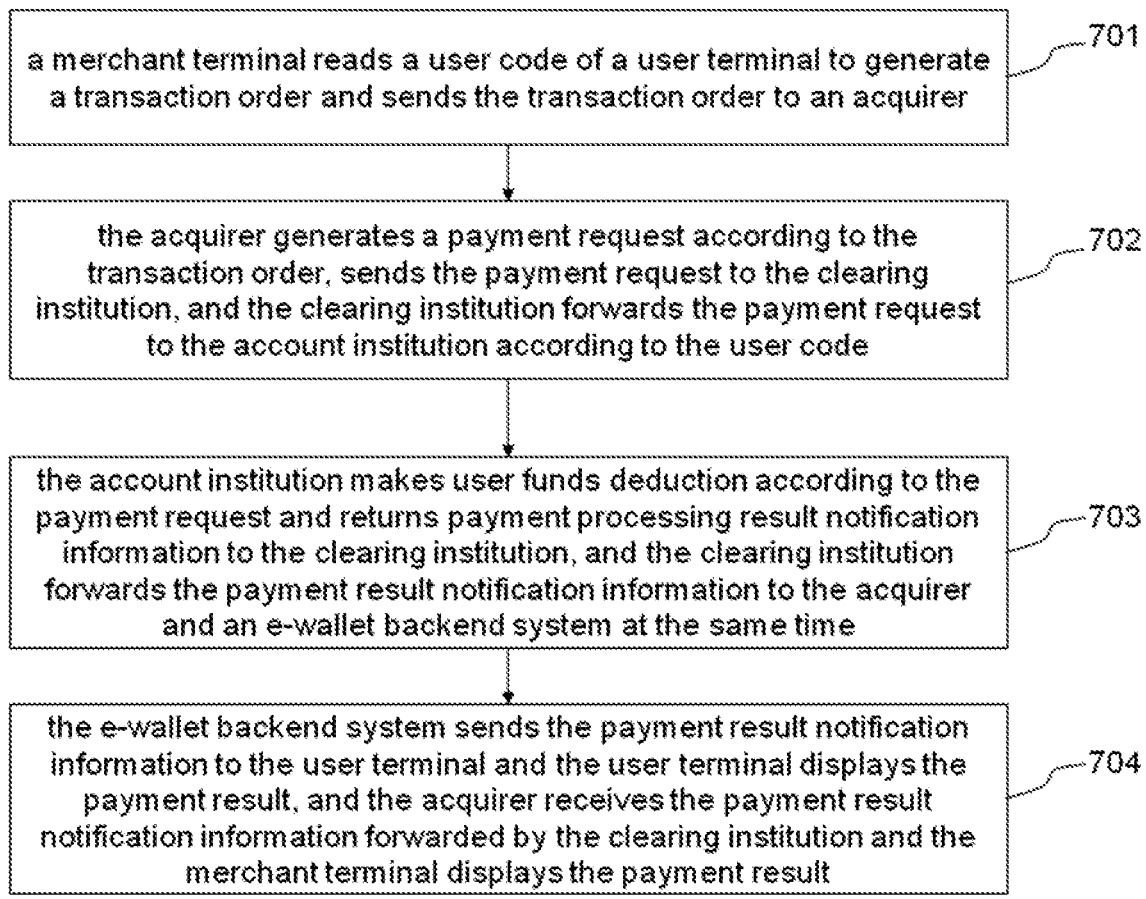
FIG. 7 is a schematic flow diagram of the payment processing method provided in an embodiment of the present application.

As shown in FIG. 7, the payment processing method comprises the following steps.

Step 701, a merchant terminal reads a user code of a user terminal to generate a order and sends the order to an acquirer.

Step 702, the acquirer generates a payment request according to the order, sends the payment request to the clearing institution, and the clearing institution forwards the payment request to the account institution according to the user code.

Step 703, the account institution makes user funds deduction according to the payment request and returns payment processing result notification information to the clearing institution, and the clearing institution forwards the payment result notification information to the acquirer and an e-wallet backend system at the same time.

Step 704, the e-wallet backend system sends the payment result notification information to the user terminal and the user terminal displays the payment result; and the acquirer receives the payment result notification information forwarded by the clearing institution and the merchant terminal displays the payment result.

It should be noted that the above explanation and description for the embodiments of the payment processing system are also applicable to the method of this embodiment and will not be repeated here.

In the embodiments of the payment processing method of the present application, a merchant terminal reading a user code of a user terminal to generate a order and sending the order to an acquirer; the acquirer generating a payment request according to the order, and send the payment request to a clearing institution, and the clearing institution forwarding the payment request to an account institution according to the user code; the account institution making user funds deduction according to the payment request and returning payment processing result notification information to the clearing institution, and the clearing institution forwarding the payment result notification information to the acquirer and an e-wallet backend system at the same time; the e-wallet backend system sending the payment result notification information to the user terminal and the user terminal displaying the payment result, and the acquirer receiving the payment result notification information forwarded by the clearing institution and the merchant terminal displaying the payment result. Thus, it solves the technical problem in the prior art that the acquirer cannot determine the account institution to which the user code belongs and the payment processing efficiency is relatively low, can realize the interconnection of the electronic wallet and the account institution through the clearing institution and improve the payment processing efficiency.

In order to realize the above embodiments, the present application also provides a payment processing method applied to a clearing institution.

Figure 8:
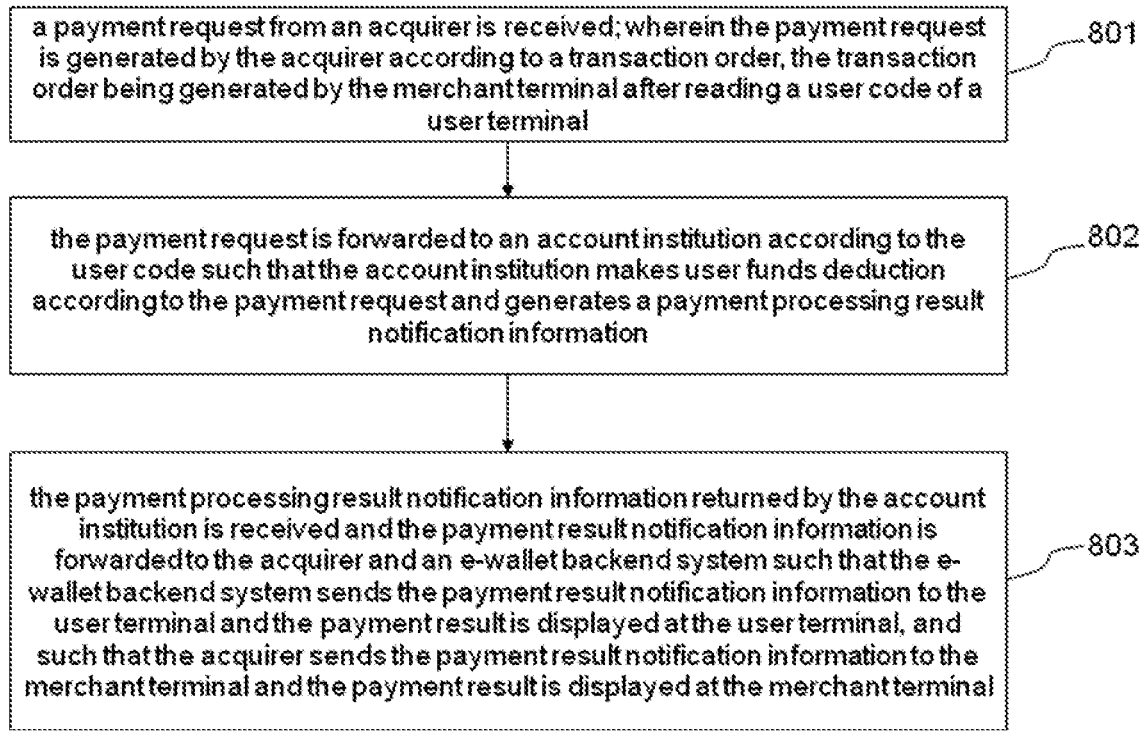
FIG. 8 is a schematic flow diagram of the payment processing method provided in another embodiment of the present application.

As shown in FIG. 8, the payment processing method comprises the following steps.

Step 801, a payment request from an acquirer is received; wherein the payment request is generated by the acquirer according to a order, the order being generated by the merchant terminal after reading a user code of a user terminal.

Step 802, the payment request is forwarded to an account institution according to the user code such that the account institution makes user funds deduction according to the payment request and generates a payment processing result notification information.

Step 803, the payment processing result notification information returned by the account institution is received and the payment result notification information is forwarded to the acquirer and an e-wallet backend system such that the e-wallet backend system sends the payment result notification information to the user terminal and the payment result is displayed at the user terminal, and such that the acquirer sends the payment result notification information to the merchant terminal and the payment result is displayed at the merchant terminal.

Specifically, in the e-wallet barcode payment, the participants comprise the user terminal (i.e. payer), the merchant terminal (i.e. payee), the acquirer, the account institution, and the clearing institution. It is understood that the user opens an account with the account institution, binds a physical account through the e-wallet application of the user terminal, and shows a user barcode in the barcode payment process. The merchant terminal uses a barcode acquiring service provided by the acquirer and accepts the payment of products by the user through various barcodes to complete transactions. The acquirer is responsible for signing the merchant into the network and daily management, providing and maintaining the barcode acceptance terminal and merchant code plate etc., receiving and processing the barcode payment instructions forwarded by the clearing institution, and handling the settlement of merchant acquiring funds. The account institution is responsible for opening user accounts and providing account services, receiving and processing the barcode payment instructions forwarded by the clearing institution, and handling user funds settlement. The clearing institution is responsible for receiving and processing the barcode payment instructions and clearing transaction funds, and plays the role of transaction intermediary transfer and funds clearing in the barcode payment business.

Specifically, in the barcode payment, a payment behavior where the user code is displayed in the e-wallet application of the user terminal and the merchant terminal reads the user code (i.e., the merchant sweeps the user code) to make payment, is usually called "code scanning for receiving payment", as shown in FIG. 2. Among them, the user code is used to uniquely identify the user's identity and payment mode, the payment tokenization technology is adopted to associate information about the user's account opened at the account institution, and the user code is generated dynamically for one-time use and is updated regularly.

Specifically, the user selects a payment mode in the e-wallet application (user terminal) of the mobile terminal, and a user code application request is sent to the e-wallet backend system. The e-wallet backend system sends the user code application request to the account institution specified by the user. The account institution generates a user code and returns it to the e-wallet backend system. The e-wallet backend system returns the user code to the e-wallet application and the e-wallet application displays the user code. The merchant terminal reads the user code through the barcode acceptance terminal, and submits the order to the acquirer. The acquirer calls a barcode payment interface and submits the payment request to the clearing institution. The clearing institution receives the payment request and forwards it to the account institution. The account institution receives the payment request forwarded by the clearing institution, completes user funds deduction, and returns the payment processing result to the clearing institution, and at the same time notifies the payment result to the e-wallet backend system. Then the e-wallet backend system notifies the e-wallet application to display the payment result to the user. The clearing institution receives the payment result notification and forwards it to the acquirer. The acquirer receives the payment result notification forwarded by the clearing institution and sends it to the merchant terminal.

The e-wallet barcode payment further comprises a business opening process before barcode payment. The business opening refers to the activity of binding a physical account in the e-wallet application of the user terminal 101.

For example, as shown in FIG. 3, the e-wallet application of the user terminal fills in the account information to be bound, which usually includes an account name, an account number, a user identity information, the contact information reserved by the user when opening the account with the account institution, etc. The e-wallet application sends the account information to the e-wallet backend system. The e-wallet backend system, according to the user's account information, submits a business opening application to the account institution to which the user's account belongs. The account institution verifies the user's identity, account information, etc. and returns the business opening result to the e-wallet backend system. The e-wallet backend system completes the binding of the users account and returns the business opening result to the e-wallet application.

Therefore, it can be seen that the coding rules of the user code are not uniform and lack of integrated management, the uniqueness and mutual exclusivity of the user code between different account institutions cannot be guaranteed, resulting in the acquirer being unable to determine the account institution to which the user code belongs and unable to initiate payment requests to the account institution via the clearing institution. Further, as respective two of e-wallets and account institutions are interconnected, interface standards are non-unique, which leads to high costs for development and maintenance caused by docking.

Regarding this problem, the payment processing method of the present application is shown in FIG. 4, the user selects a payment mode in the e-wallet application (user terminal) of the mobile terminal, and a user code application request is sent to the e-wallet backend system. The e-wallet backend system sends the user code application request to the clearing institution, and the clearing institution generates a user code and returns it to the e-wallet backend system. The e-wallet backend system returns the user code to the e-wallet application and the e-wallet application displays the user code. The merchant terminal reads the user code through the barcode acceptance terminal, and the merchant terminal submits the order to the acquirer. The acquirer calls a barcode payment interface and submits the payment request to the clearing institution. The clearing institution receives the payment request, selects the account institution to which the account belongs according to the user code and forwards the payment request to the account institution. The account institution receives the payment request forwarded by the clearing institution, completes user funds deduction, returns the payment processing result to the clearing institution. The clearing institution receives the payment result notification and forwards it to the acquirer. Meanwhile, the clearing institution 103 notifies the payment result to the e-wallet backend system, and then the e-wallet backend system notifies the e-wallet application to display the payment result to the user. The acquirer receives the payment result notification forwarded by the clearing institution and displays the barcode payment result to the merchant.

Based on the above description, the present application can also support a scenario of code scanning for receiving payment of an offline e-wallet barcode payment, where the e-wallet application and the clearing institution use the same fixed algorithm, and dynamically generate a user code according to business opening result. The fixed algorithm keeps the user code for one-time use and regular updates, including but not limited to one-time password algorithms based on time and counts, etc., as shown in FIG. 5.

The e-wallet application of the user terminal selects a payment mode and the e-wallet application generates a user code using a fixed algorithm. The merchant terminal reads the user code through the barcode acceptance terminal, and submits the order to the acquirer. The acquirer calls a barcode payment interface and submits the payment request to the clearing institution. The clearing institution receives the payment request, verifies the user code using the fixed algorithm, selects the account institution to which the account belongs according to the user code and forwards the payment request to the account institution. The account institution receives the payment request forwarded by the clearing institution, completes user funds deduction, and returns the payment processing result to the clearing institution. The clearing institution receives the payment result notification and forwards it to the acquirer. Meanwhile, the clearing institution 103 notifies the payment result to the e-wallet backend system, and then the e-wallet backend system can try to notify the e-wallet application to display the payment result to the user. The acquirer receives the payment result notification forwarded by the clearing institution and displays the barcode payment result to the merchant terminal.

In the present application, the business opening of e-wallet barcode payment may be carried out in the way shown in FIG. 6, the interconnection of e-wallet and account institution may be conducted through clearing institution, and the ability of one-point access to functions and service interoperability of e-wallet and account institution may be realized by means of unified interface standard and unified coding specification.

Specifically, as shown in FIG. 6, the e-wallet application of the user terminal fills in the account information to be bound, and sends the account information to be bound to the e-wallet backend system. The e-wallet backend system submits a business opening application request to the clearing institution. The clearing institution receives the business opening application request, records the account information, and forwards it to the account institution. The account institution verifies the user identity, the account information, etc. and returns business opening result to clearing institution. Then the clearing institution records the business opening result and forwards it to the e-wallet backend system. The e-wallet backend system completes user account binding and returns the business opening result to the e-wallet application.

It should be noted that the present application may also provide support when multiple e-wallets are bound to the same user's physical account. The clearing institution may determine whether the account has been bound, and return the business opening result directly to the e-wallet backend system for a bound account information, to further improve the payment processing efficiency.

The embodiments of the payment processing method of the present application, applied to a clearing institution, comprise: receiving a payment request generated by an acquirer according to a order; a merchant terminal reading a user code of a user terminal to generate a order; forwarding the payment request to an account institution according to the user code such that the account institution makes user funds deduction according to the payment request and generates a payment processing result notification information that returns to a clearing institution; forwarding the payment result notification information to the acquirer and an e-wallet backend system at the same time such that the e-wallet backend system sends the payment result notification information to the user terminal and the payment result is displayed at the user terminal, and the acquirer sending the payment result notification information to the merchant terminal and the merchant terminal displaying the payment result. Thus, it solves the technical problem in the prior art that the uniqueness and mutual exclusivity of the user code between different account institutions cannot be guaranteed, resulting in the acquirer being unable to determine the account institution to which the user code belongs and unable to initiate payment requests to the account institution via the clearing institution, and the payment processing efficiency is relatively low, and can realize the interconnection between the e-wallet and the account institution via the clearing institution and improve the payment processing efficiency.

In order to realize the above embodiments, the present application also provides a payment processing device.

Figure 9:
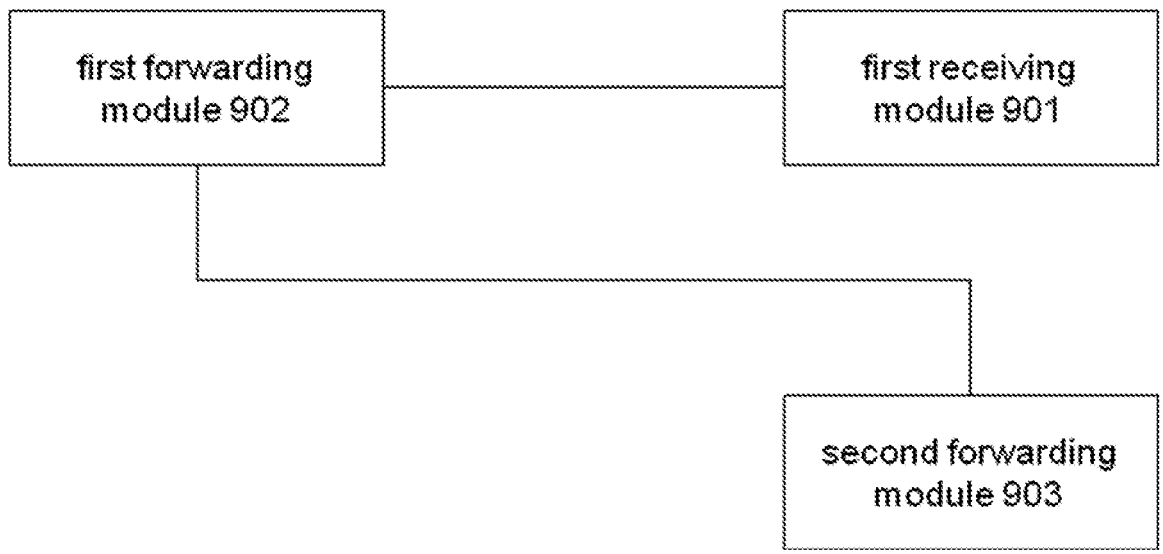
FIG. 9 is a schematic diagram of the structure of the payment processing system provided in another embodiment of the present application.

As shown in FIG. 9, the payment processing device is applied to a clearing institution and comprises: a first receiving module 901, a first forwarding module 902 and a second forwarding module 903.

The first receiving module 901 is configured for receiving a payment request from an acquirer; wherein the payment request is generated by the acquirer according to a order, the order being generated by a merchant terminal after reading a user code of a user terminal.

The first forwarding module 902 is configured for forwarding the payment request to an account institution according to the user code such that the account institution makes user funds deduction according to the payment request and generates a payment processing result notification information.

The second forwarding module 903 is configured for receiving the payment processing result notification information returned by the account institution and forwarding the payment result notification information to the acquirer and an e-wallet backend system such that the e-wallet backend system sends the payment result notification information to the user terminal and the payment result is displayed at the user terminal, and such that the acquirer sends the payment result notification information to the merchant terminal and the payment result is displayed at the merchant terminal.

As a first possible way of implementation of embodiments of the present application, the payment processing device further comprises:
- a second receiving module for receiving a user code application request from the e-wallet backend system, the user code application request being forwarded by the e-wallet backend system according to the user code application request from the user terminal;
- a sending module for generating a user code according to the user code application request and returning the user code to the e-wallet backend system, so that the e-wallet backend system returns the user code to the user terminal and the user code is displayed at the user terminal.

As a second possible way of implementation of embodiments of the present application, the payment processing device further comprises:
- a third receiving module for receiving a business opening application request from the e-wallet backend system, the business opening application request being generated by the e-wallet backend system according to an account information to be bound acquired and sent by the user terminal;
- an acquisition-record module for acquiring the account information to be bound according to the business opening application request, recording the account information to be bound in an account information, and forwarding the account information to be bound to the account institution such that the account institution verifies the account information to be bound and generates a business opening result;
- a receiving-forwarding module for receiving the business opening result returned by the account institution and forwarding the business opening result to the e-wallet backend system, so that the e-wallet backend system returns the business opening result to the user terminal.

As a third possible way of implementation of embodiments of the present application, the payment processing device further comprises:
- a determination module for determining whether the account information to be bound is a bound account information according to the recorded information;
- a return module for returning the business opening result directly to the e-wallet backend system, if the account information to be bound is a bound account information.

As a fourth possible way of implementation of embodiments of the present application, the second forwarding module 902 is specifically configured for:
- verifying the user code by means of a predetermined fixed algorithm; wherein the user code is generated by the user terminal by means of the predetermined fixed algorithm;
- selecting the account institution to which the account belongs according to the user code and forwarding the payment request to the account institution.

As a fifth possible way of implementation of embodiments of the present application, the account information to be bound comprises at least one of:
- an account name;
- an account number;
- a user identification information;
- a contact information reserved by a user when opening an account with the account institution.

The embodiments of the payment processing device of the present application, applied to a clearing institution, comprise: receiving a payment request generated by an acquirer according to a order; wherein, a merchant terminal reading a user code of a user terminal to generate a order; forwarding the payment request to an account institution according to the user code such that the account institution makes user funds deduction according to the payment request and generates a payment processing result notification information that returns to a clearing institution; forwarding the payment result notification information to the acquirer and an e-wallet backend system at the same time such that the e-wallet backend system sends the payment result notification information to the user terminal and the payment result is displayed at the user terminal, and such that the acquirer sends the payment result notification information to the merchant terminal and the payment result is displayed at the merchant terminal. Thus, it solves the technical problem in the prior art that the uniqueness and mutual exclusivity of the user code between different account institutions cannot be guaranteed, resulting in the acquirer being unable to determine the account institution to which the user code belongs and unable to initiate payment requests to the account institution by the clearing institution, and the payment processing efficiency is relatively low, and can realize the interconnection between the e-wallet and the account institution via the clearing institution and improve the payment processing efficiency.

In order to implement the above embodiments, the present application provides a computer device comprising a memory, a processor and a computer program stored in the memory and executable by the processor, the payment processing method as described in the above embodiments being implemented when the processor executes the program.

In order to implement the above embodiments, the present application provides a non-transitory computer readable storage medium having a computer program stored thereon, the payment processing method as described in the above embodiments being implemented when the program is executed by the processor.

In the description of this specification, the terms "an embodiment", "some embodiments", "example", "specific examples", or "some examples" or the like means that the specific features, structures, materials, or characteristics described in connection with the embodiment or example are included in at least one embodiment or example of the present application. In this specification, the schematic representation of the above terms does not have to be directed to the same embodiment or example. Moreover, the specific features, structures, materials, or characteristics described may be combined in a suitable manner in any one or more embodiments or examples. In addition, without contradicting each other, a person skilled in the art may bind and combine the different embodiments or examples described in this specification as well as the features of the different embodiments or examples.

In addition, the terms "first" and "second" are used for descriptive purposes only and are not to be construed as indicating or implying relative importance or implicitly specifying the number of technical features indicated. Thus, the features defined with "first" and "second" may explicitly or implicitly comprise at least one such feature. In the description of the present application, "plurality" means at least two, such as two, three, etc., unless otherwise expressly and specifically limited.

Any process or method description in the flowchart or otherwise described herein may be understood to represent a module, fragment, or portion of code comprising one or more executable instructions for implementing steps of a customized logical function or process, and the scope of the preferred embodiments of the present application include additional implementations in which the functions may be performed not in the order shown or discussed, including according to the functions involved in a substantially simultaneous manner or in the reverse order, as should be understood by those skilled in the art to which the embodiments of the present application belong.

The logic and/or steps represented in a flowchart or otherwise described herein, for example, may be considered a sequential list of executable instructions for implementing a logical function that may be specifically implemented in any computer-readable medium for use by an instruction execution system, device, or apparatus (e.g., a computer-based system, a system including a processor, or other system that can take instructions from an instruction execution system, device, or apparatus and execute the instructions), or for use in conjunction with these instruction execution system, device, or apparatus. For purposes of this specification, "computer readable medium" may be any device that can contain, store, communicate, disseminate, or transmit a program for use by or in conjunction with an instruction execution system, device, or apparatus.

It should be understood that the various parts of the present application may be implemented with hardware, software, firmware, or a combination thereof. In the above embodiments, multiple steps or methods may be implemented with software or firmware stored in memory and executed by a suitable instruction execution system. For example, if implemented in hardware as in another embodiment, techniques well known in the art may be used.

A person of ordinary skill in the art can understand that all or some of the steps carried out to implement the method of the above embodiments can be accomplished by instructing the relevant hardware by means of a program, the program can be stored in a computer readable storage medium, and when the program is executed, it comprises one of the steps of the method embodiments or a combination thereof.

In addition, each functional unit in each embodiment of the present application can be integrated in a single processing module, or the individual units can be physically present separately, or two or more units can be integrated in a single module. The above integrated modules can be implemented either in the form of hardware or in the form of software functional modules. The integrated modules may also be stored in a single computer readable storage medium if they are implemented in the form of software function modules and sold or used as standalone products.

Although embodiments of the present application have been shown and described above, it is understood that the above embodiments are exemplary and are not to be construed as limiting the present application, and that variations, modifications, replacements and variants of the above embodiments may be made by those of ordinary skill in the art within the scope of the present application.

What is claimed is:

1. A payment processing system, comprising:
   a user terminal, a merchant terminal, an e-wallet backend system, a clearing institution, an acquirer and an account institution;
   the user terminal acquiring account information to be bound and sending it to the e-wallet backend system;
   the e-wallet backend system sending a business opening application request to the clearing institution according to the account information to be bound;
   the clearing institution acquiring the account information to be bound according to the business opening application request, recording the account information to be bound, and forwarding the account information to be bound to the account institution;
   the account institution verifying the account information to be bound and returning a business opening result to the clearing institution; and
   the clearing institution recording the business opening result and forwarding the business opening result to the e-wallet backend system, and the e-wallet backend system returning the business opening result to the user terminal;
   the e-wallet backend system sending a user code application request to the clearing institution;
   the clearing institution generating a scannable user code based on the user code application request, wherein the scannable user code comprises a user identifier, a payment mode, and the user's account information, wherein the scannable user code is generated dynamically for one-time use and is updated regularly;
   the clearing institution sending the generated user code to the e-wallet backend system;
   the e-wallet backend system returning the user code to the user terminal and displaying the user code at the user terminal;
   the merchant terminal reading the user code of the user terminal to generate a transaction order and sending the transaction order to the acquirer;
   the acquirer generating a payment request according to the transaction order, and sending the payment request to the clearing institution;
   the clearing institution forwarding the payment request to the account institution according to the user code;
   the account institution making user funds deduction according to the payment request and returning payment processing result notification information to the clearing institution;
   the clearing institution forwarding the payment result notification information to the acquirer and the e-wallet backend system at the same time;
   the e-wallet backend system sending the payment result notification information to the user terminal and the user terminal displaying a payment result; and
   the acquirer receiving the payment result notification information forwarded by the clearing institution and the merchant terminal displaying the payment result.

2. The payment processing system according to claim 1, before the merchant terminal reading the user code of the user terminal to generate a transaction order, further comprising: the user terminal sending a user code application request to the e-wallet backend system; the clearing institution generating a user code according to the user code application request and sending it to the e-wallet backend system, the e-wallet backend system returning the user code to the user terminal and displaying the user code at the user terminal.

3. The payment processing system according to claim 2, before forwarding the account information to be bound to the account institution, further comprising: the clearing institution determining whether the account information to be bound is bound account information according to recorded information; returning the business opening result directly to the e-wallet backend system, if the account information to be bound is a bound account information.

4. The payment processing system according to claim 1, before the merchant terminal reading the user code of the user terminal to generate a transaction order, further comprising: the user terminal generating the user code by means of a predetermined fixed algorithm.

5. The payment processing system according to claim 4, wherein the clearing institution forwarding the payment request to the account institution comprises: the clearing institution verifying the user code by means of the predetermined fixed algorithm; selecting the account institution to which the account belongs according to the user code and forwarding the payment request to the account institution.

6. The payment processing system according to claim 1, wherein the account information to be bound comprises: one or more of an account name, an account number, a user identification information and a contact information reserved by a user when opening an account with the account institution.

7. A payment processing method, comprising the following steps:
  a user terminal acquiring account information to be bound and sending it to an e-wallet backend system;
  the e-wallet backend system sending a business opening application request to a clearing institution according to the account information to be bound;
  the clearing institution acquiring the account information to be bound according to the business opening application request, recording the account information to be bound, and forwarding the account information to be bound to an account institution;
  the account institution verifying the account information to be bound and returning a business opening result to the clearing institution; and
  the clearing institution recording the business opening result and forwarding the business opening result to the e-wallet backend system, and the e-wallet backend system returning the business opening result to the user terminal;
  the e-wallet backend system sending a user code application request to the clearing institution;
  the clearing institution generating a scannable user code based on the user code application request, wherein the scannable user code comprises a user identifier, a payment mode, and the user's account information, wherein the scannable user code is generated dynamically for one-time use and is updated regularly;
  the clearing institution sending the generated user code to the e-wallet backend system;
  the e-wallet backend system returning the user code to the user terminal and displaying the user code at the user terminal;
  a merchant terminal reading the user code of a user terminal to generate a transaction order and sending the transaction order to the acquirer;
  the acquirer generating a payment request according to the transaction order, sending the payment request to the clearing institution;
  the clearing institution forwarding the payment request to the account institution according to the user code;
  the account institution making user funds deduction according to the payment request and returning payment processing result notification information to the clearing institution;
  the clearing institution forwarding the payment result notification information to the acquirer and the e-wallet backend system at the same time;
  the e-wallet backend system sending the payment result notification information to the user terminal and the user terminal displaying a payment result; and
  the acquirer receiving the payment result notification information forwarded by the clearing institution and the merchant terminal displaying the payment result.

8. A payment processing method, being applied to a clearing institution, comprising the following steps:
  a user terminal acquiring account information to be bound and sending it to an e-wallet backend system;
  the e-wallet backend system sending a business opening application request to a clearing institution according to the account information to be bound;
  the clearing institution acquiring the account information to be bound according to the business opening application request, recording the account information to be bound, and forwarding the account information to be bound to an account institution;
  the account institution verifying the account information to be bound and returning a business opening result to the clearing institution; and
  the clearing institution recording the business opening result and forwarding the business opening result to the e-wallet backend system, and the e-wallet backend system returning the business opening result to the user terminal;
  the e-wallet backend system sending a user code application request to the clearing institution;
  the clearing institution generating a scannable user code based on the user code application request, wherein the scannable user code comprises a user identifier, a payment mode, and the user's account information, wherein the scannable user code is generated dynamically for one-time use and is updated regularly;
  the clearing institution sending the generated user code to the e-wallet backend system;
  the e-wallet backend system returning the user code to the user terminal and displaying the user code at the user terminal;
  receiving a payment request from an acquirer, wherein the payment request is generated by the acquirer according to a transaction order, the transaction order being generated by a merchant terminal after reading the user code of the user terminal;
  forwarding the payment request to the account institution according to the user code such that the account institution makes user funds deduction according to the payment request and generates a payment processing result notification information; and
  receiving the payment processing result notification information returned by the account institution and forwarding the payment result notification information to the acquirer and the e-wallet backend system, such that the e-wallet backend system sends the payment result notification information to the user terminal and the payment result is displayed at the user terminal, and such that the acquirer sends the payment result notification information to the merchant terminal and the payment result is displayed at the merchant terminal.

9. The payment processing method according to claim 8, before receiving a payment request from an acquirer, further comprising: the user code application request being forwarded by the e-wallet backend system according to the user code application request from the user terminal; generating the user code according to the user code application request and returning the user code to the e-wallet backend system, so that the e-wallet backend system returns the user code to the user terminal and the user code is displayed at the user terminal.

10. The payment processing method according to claim 9, before forwarding the account information to be bound to the account institution, further comprising: determining whether the account information to be bound is a bound account information according to recorded information; returning the business opening result directly to the e-wallet backend system, if the account information to be bound is a bound account information.

11. The payment processing method according to claim 8, wherein forwarding the payment request to an account institution according to the user code comprises: verifying the user code by means of a predetermined fixed algorithm; wherein the user code is generated by the user terminal by means of the predetermined fixed algorithm; selecting the account institution to which the account belongs according to the user code and forwarding the payment request to the account institution.

12. The payment processing method according to claim 8, wherein in that the account information to be bound comprises at least one of: an account name; an account number; a user identification information; a contact information reserved by a user when opening an account with the account institution.

* * * * *